US011050294B1

(12) United States Patent
Majd et al.

(10) Patent No.: US 11,050,294 B1
(45) Date of Patent: Jun. 29, 2021

(54) POWER SUPPLY SHEDDING FOR POWER EFFICIENCY OPTIMIZATION (71) Applicant: Amazon Technologies, Inc., Seattle, WA (US)

(72) Inventors: Afshin Majd, Seattle, WA (US); Michael Moen, Olympia, WA (US)

(73) Assignee: Amazon Technologies, Inc., Seattle, WA (US)

( * ) Notice: Subject to any disclaimer, the term of this patent is extended or adjusted under 35 U.S.C. 154(b) by 12 days.

(21) Appl. No.: 16/457,334

(22) Filed: Jun. 28, 2019

(51) Int. Cl.
*H02J 9/06* (2006.01)
*H02J 9/04* (2006.01)

(52) U.S. Cl.
CPC ............. *H02J 9/061* (2013.01); *H02J 9/062* (2013.01); *H02J 9/04* (2013.01); *H02J 9/06* (2013.01)

(58) Field of Classification Search
CPC ...... H02J 9/04; H02J 9/06; H02J 9/061; H02J 9/062
USPC ..................................................... 307/64–66
See application file for complete search history.

(56) References Cited

U.S. PATENT DOCUMENTS

| 2010/0037078 | A1 | 2/2010 | Gross et al. |
| 2010/0241890 | A1 | 9/2010 | Goodart et al. |
| 2011/0175452 | A1 | 7/2011 | Hoshino |
| 2012/0303993 | A1 | 11/2012 | Nishtala et al. |
| 2014/0208129 | A1* | 7/2014 | Morales ............ H02J 9/06 713/300 |
| 2015/0121113 | A1 | 4/2015 | Ramamurthy et al. |
| 2015/0270745 | A1 | 9/2015 | Ogura |
| 2015/0309951 | A1 | 10/2015 | Breakstone et al. |
| 2019/0067958 | A1 | 2/2019 | Zimnicki et al. |
| 2019/0094951 | A1 | 3/2019 | Mori |
| 2019/0237996 | A1 | 8/2019 | Kurk et al. |
| 2019/0272012 | A1 | 9/2019 | Kachare et al. |
| 2020/0133379 | A1 | 4/2020 | Muccini et al. |

OTHER PUBLICATIONS

U.S. Appl. No. 16/368,333, "Backup Assisted Power Supply System", filed Mar. 28, 2019.

* cited by examiner

*Primary Examiner* — Hal Kaplan
(74) *Attorney, Agent, or Firm* — Kilpatrick Townsend & Stockton LLP (57) ABSTRACT

Systems and methods for managing a collection of power supply units (PSUs), such as those used in a datacenter environment, can include detecting changes in an output load on the PSUs to less than a target output load that is based on a target efficiency of the PSUs. In response to the indication that the output load is decreasing, PSUs can be selectively deactivated so that that an average output load of remaining, active PSUs of the collection of PSUs remains above the target output load corresponding to the target efficiency of the PSUs.

20 Claims, 10 Drawing Sheets

POWER SUPPLY SHEDDING FOR POWER EFFICIENCY OPTIMIZATION

BACKGROUND

A datacenter typically contains a collection of computer servers and components for the management, operation, and connectivity of those servers. Power can be supplied to such components by sources of externally-supplied power, in additional to optional short-term backup power solutions such as backup battery units (BBUs) or supercapacitors that prevent data loss during power loss events. Externally-supplied power can include a high-voltage AC power source that must be appropriately conditioned, converted to DC power, and stepped appropriately in current and/or voltage before it can be utilized by most datacenter components. Backup power may include AC power (e.g., generators) or DC power (e.g., batteries), but in either case, must also be conditioned. One component in the conditioning process is a power supply unit or PSU. PSUs can also be used to condition power supplied by the various backup power solutions, and any number of PSUs may be used in parallel to handle the range of output loads that might be required at any given moment.

BRIEF DESCRIPTION OF THE DRAWINGS

Various embodiments in accordance with the present disclosure will be described with reference to the drawings, in which.

DETAILED DESCRIPTION

In a modern datacenter, the continuity of power to servers and other electronic components can be maintained by employing redundant power supplies, including backup power supplies, in combination with continuous power supplies such as externally-supplied high-voltage AC power that is routed through and conditioned at power supply units (PSUs). Due to the high power demands of datacenter systems, and the unpredictable nature of line power outages, power systems in modern datacenters may employ redundancy in any and all such components, including multiple PSUs that condition and provide power from the external and backup power sources to the various electronic components, switching systems, servers and server racks.

PSUs in a modern datacenter are distributed, may be capable of rapid and safe line-switching between multiple sources, and can handle large output loads. However, the process of stepping current/voltage, power quality correction, and converting to DC power from an AC source incurs a degree of efficiency loss. This efficiency loss can vary depending on factors including, e.g., the output load on the PSU. The efficiency of any given PSU may be highest within a high-efficiency band that is less than the maximum rated output load of the PSU, and drops off at output loads that are high and low compared to the high efficiency band. In some PSUs, the high efficiency band may center at about 50% of the maximum rated output load, depending on the design and intended purpose of the specific PSU.

Embodiments described herein are directed to methods and systems of managing the output load on the PSUs by systematically shedding and reactivating PSUs that are configured with a common load based on the amount of that load. Methods and systems described herein relate to actively managing (i.e., activating and deactivating) PSUs based on loading conditions so that active PSUs operate in a high-efficiency regime, thus improving overall efficiency in a datacenter environment. In addition, various embodiments are directed to methods of monitoring efficiency losses in the PSU, predicting output load peaks and valleys, and managing PSU availability based on these predicted load requirements to increase average efficiency over time.

In the following description, various embodiments will be described. For purposes of explanation, specific configurations and details are set forth in order to provide a thorough understanding of the embodiments. However, it will also be apparent to one skilled in the art that the embodiments may be practiced without the specific details. Furthermore, well-known features may be omitted or simplified in order not to obscure the embodiment being described.

Figure 1:
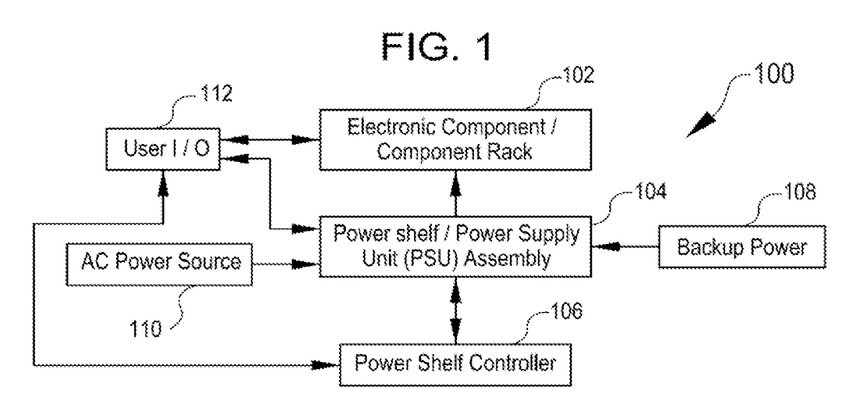
FIG. 1 is a high-level block diagram illustrating a system for powering electronic components, in accordance with various embodiments.

FIG. 1 is a high-level block diagram illustrating a system 100 for powering electronic components, in accordance with various embodiments. The system 100 includes electronic components or component racks 102 such as, but not limited to, datacenter servers or server racks, switches, networking devices, or any other suitable set of electronic devices. Power is supplied to the system 100 by way of an AC power source 110, which can be a utility power source or other high voltage AC power supply, generator power, or other power source. The electrical power is routed through a collection of PSUs and/or combined PSUs and switching apparatuses, herein referred to as a power shelf 104 (or PSU assembly). The PSUs in the power shelf 104 are responsible for converting and conditioning power from the AC power source 110 for use in the electronic components 102, and may also manage power from multiple power supplies and/or any number of backup power supplies 108 (e.g. BBUs or supercapacitors). Performance characteristics, efficiency, and capacity of the PSUs in the power shelf 104 can be monitored and controlled by a power shelf controller 106, which can include an onboard processor and memory, either separate from or in communication with the electronic components 102. The electronic components 102 (and/or the power shelf controller 106) can be controlled by and can communicate with users by any suitable user I/O device 112. The physical PSUs making up the power shelf can be arranged as a set of parallel PSUs sharing a single "shelf" of an electronics containment cabinet, server rack, or other structure, However, it will be understood that the principles described in this disclosure extend to any suitable format in which PSUs can be arranged to work in parallel, without limiting the structures or physical proximity associated with the PSUs.

When in use, the system 100 operates to supply power to the electronic components or component rack 102 from either the AC power source 110 or from backup power 108, or a combination of the two. AC power from the AC power source 110 is connected with multiple PSUs of the power shelf 104, where the PSUs condition, convert, and step high-voltage AC power (which can be multi-phase power) into comparatively low-voltage DC power for providing to the electronic components 102. The power shelf 104 can contain any suitable number of PSUs. The number and capacity of the PSUs in the power shelf are selected to supply a known level of output load, and matched to a known level of demand (i.e., a standard or preselected number of servers or other electronic components 102), with a degree of redundancy and margin. For example, the number of PSUs and individual electronic components can be selected so that the system 100 has at least 'n+1' redundancy, in which capacity selection is based on 'n' PSUs, and one additional PSU is provided to accommodate the event of single-point failure. Depending on the degree of importance of any given electronic system, any suitable redundancy scheme can be applied, e.g. 'n+2', 'n+n', etc. Capacity determinations can be based on an expected range of output loads that can be supported by 'n' PSUs with or without an additional margin.

The system 100 is configured to provide power for electronic components 102 that may only occasionally draw their full capacity, often with redundancy that can provide power beyond the maximum expected output load. For these reasons, depending on the current utilization of the electronic components 102, the power shelf 104 may operate for extended periods of time well below its design capacity. Modern PSUs are designed to operate at a high efficiency at particular loads, but physical constraints prevent PSUs from retaining that nominal efficiency across their entire output load range. PSUs in the power shelf 104 can have generally high efficiencies when operating within specific output load ranges, which are specific to the particular PSUs, but can drop off in efficiency when used at output loads outside those ranges. In particular, PSUs can drop in efficiency when utilized at very low output loads. In accordance with various embodiments of the present disclosure, the system 100 can manage the power shelf 104 by shedding and reactivating select PSUs in order to sustain high efficiencies.

Figure 2:
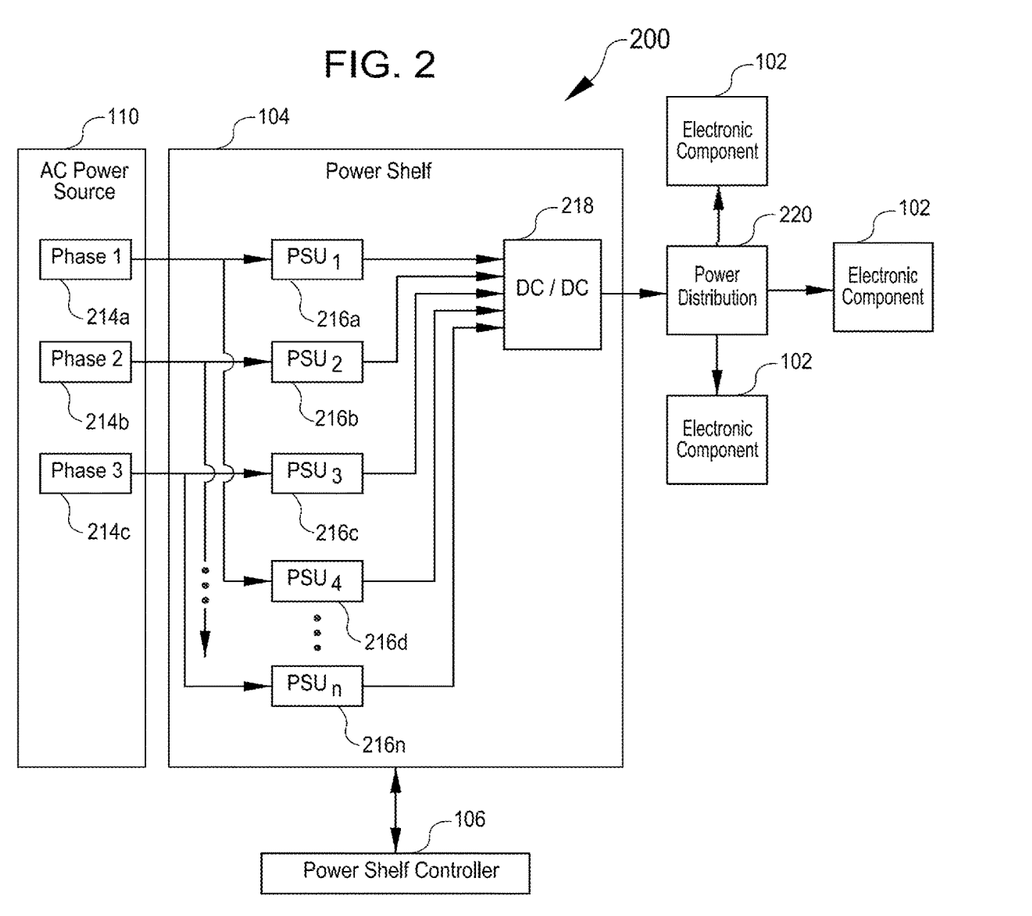
FIG. 2 is a block diagram illustrating an embodiment of the system of FIG. 1.

FIG. 2 is a block diagram illustrating an approach to managing output loads on PSUs in accordance with the system 100 shown in FIG. 1, by actively managing (i.e., shedding and reactivating) PSUs in a collection of PSUs that operate in parallel, such as a power shelf, to power a selection of electronic components. FIG. 2 shows a specific implementation of system 100 (FIG. 1), with emphasis on aspects of the power source 110 and power shelf 104. However, it will be understood that the disclosure is not limited to embodiments containing every component shown in FIG. 2. The power management system 200 includes AC power source 110 which provides power to a selection of electronic components 102 via power shelf 104. Aspects of the operation of the power shelf 104 can be controlled by a power shelf controller 106, which can include any suitable number of processors and nonvolatile memory for storing and executing instructions that operate the power shelf. The electronic components 102 can receive power by way of a power distribution assembly 220 such as, e.g., a power rail or other suitable distribution system.

The power shelf 104 contains a collection of PSUs 216, which are primarily responsible for receiving and conditioning power from the AC power source 110 (or, alternatively, from any other suitable power source) for use by the electronic components 102. The power shelf 104 may also include other components not shown here, e.g., transfer switches, breakers, or other components. In some embodiments, the PSUs 216 route power to a DC/DC converter 218, which steps down high-voltage DC power for provision to the electronic components 102. As described above, PSUs 216 are configured to operate in parallel. In some embodiments, the PSUs can draw from a single source. However, in some embodiments (and as shown), PSUs can also draw power from distinct phases of a multi-phase AC power source 110. By way of example, the AC power source 110 as shown includes a first phase 214a, second phase 214b, and third phase 214c. In some embodiments, each discrete phase is handled by a PSU, e.g., first phase 214a by $PSU_1$ 216a, second phase 214b by $PSU_2$ 216b, and third phase 214c by $PSU_3$ 216c. In some embodiments, where the power shelf 104 contains more PSUs than there are power supply phases, multiple PSUs may handle each phase, e.g., first phase 214a by $PSU_4$ 216d also. Any suitable number of PSUs can be present in the power shelf 104. In some embodiments, the number of PSUs is a multiple of the number of AC power phases (e.g., in a three-phase system, third phase 214c may be handled by $PSU_n$, for systems with 'n' PSUs.

The specific configurations of PSUs in a power shelf (or alternative structure of PSUs that operate in parallel) can vary, provided multiple PSUs are used in conjunction to provide power to the electronic devices 102. Specific methods of balancing PSU usage across the power shelf 104 are described below with reference to a varying output load.

Figure 3:
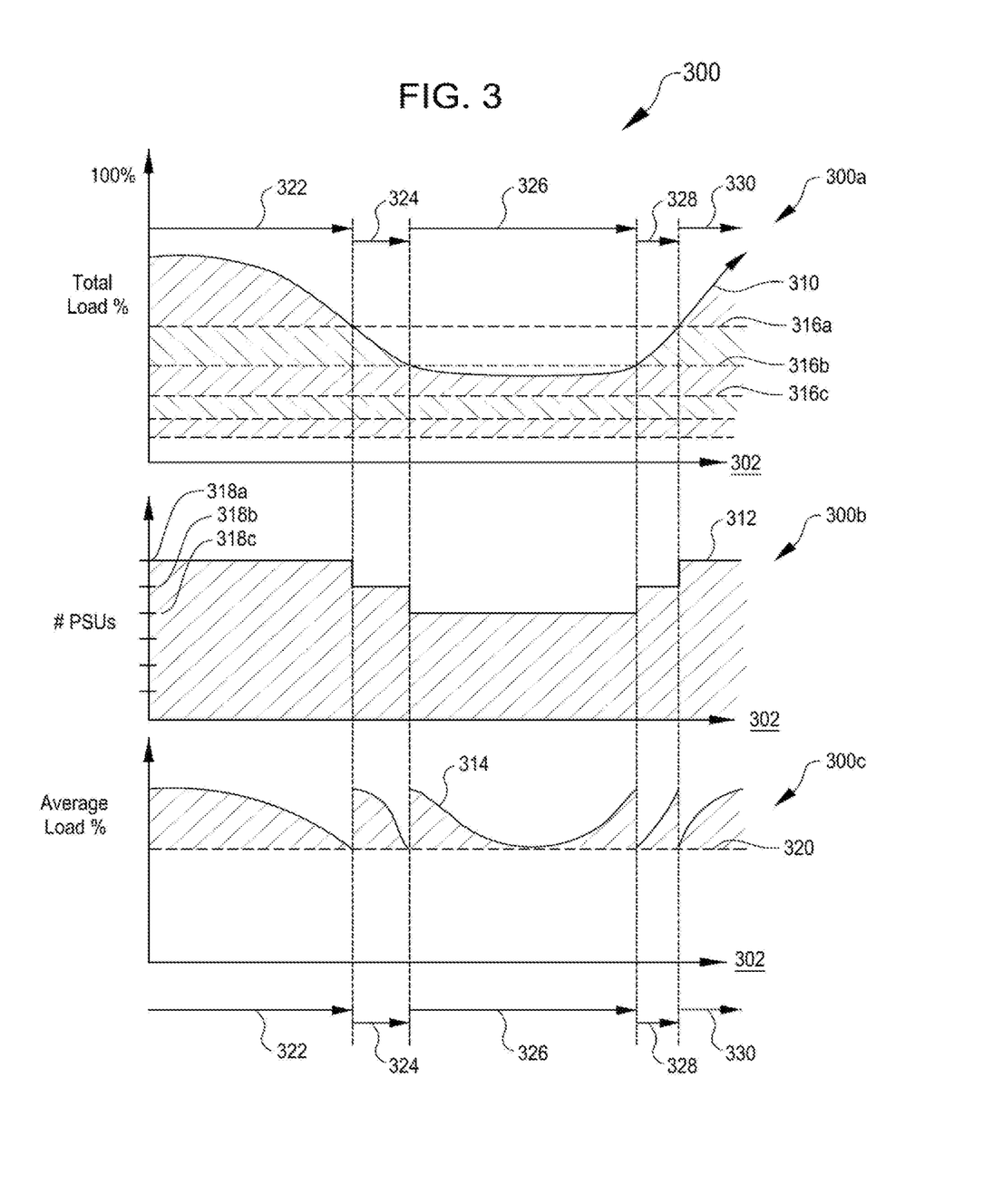
FIG. 3 is a chart illustrating a first example of efficiency optimization via selective power supply utilization that can be employed in the systems of FIGS. 1-2, and according to various embodiments of the present disclosure.

FIG. 3 is a collection of charts 300 illustrating a first example of PSU management in accordance with the systems of FIGS. 1 and 2, and in accordance with various embodiments of the present disclosure. Specifically, FIG. 3 illustrates a simplified example of active PSU management in which a control system (e.g., power shelf controller 106) in conjunction with a power shelf (e.g., power shelf 104) monitors an output load across the power shelf and selectively deactivates or activates PSUs in the power shelf to improve power shelf efficiency. A total load chart 300a illustrates a fluctuating total output load 310 as a percent of total load 304 on a power source (e.g. AC power source 110) by the power shelf 104. A PSU management chart 300b illustrates, in discrete steps, a number of PSUs (or PSU utilization) 312 of the collection of PSUs 406 making up a power shelf that are "active" as opposed to temporarily disabled or inactive. Finally, an average load chart 300c illustrates the effect of PSU deactivation and subsequent reactivation on the effective output load seen by each individual active PSU based on the changing total output load 310 and the PSU utilization 312. Charts 300a-c are not shown to scale.

The total output load chart 300a shows a simple fluctuation in a total output load 310 with respect to time 302, whereby the total output load falls as might occur when an electronic resource, such as a server, is underutilized, and then a subsequent rise. During this event, the total output load 310 may cross one or several thresholds 316. Each threshold corresponds to a minimum output load 320 at which the average output load 314 (as a % average load 308) across PSUs would fall below a high efficiency band or envelope in which PSUs operate most efficiently. For example, some PSUs may operate most efficiently when utilized at about 50% of their nominal capacity. In simplified embodiments that do not have redundancy, when the total output load 310 falls below 50% of the total capacity, the average output load 314 necessarily falls below 50% of each PSU's nominal capacity. Similarly, for systems with redundancy (e.g. 'n+1' redundancy), when the total output load 310 falls below 60% of the total capacity, the average output load 314 falls below 50% of each PSU's nominal capacity.

Note that the minimum output load can vary, and depends on the technical specifications and purpose of the PSU. According to various embodiments, a given power supply system can include a stored data (e.g. in table format, or comparable) indicating an appropriate number of PSUs to activate depending on the current total output load at any given time. When the current total output load for a collection of PSUs drops below a predefined threshold (e.g., 60%) or the average output load across each active PSU drops below a predefined threshold (e.g., 50%), the system can detect the drop in power demand and respond by accessing the stored data and reducing the number of active PSUs. The appropriate number of PSUs, or an optimal number of PSUs, generally corresponds to the smallest number of PSUs that can operate at one time while the PSUs remain close to their optimal (i.e., most efficient) output load.

As the total output load 310 changes, multiple thresholds 316a-c may be crossed, e.g., a first segment 322 can end when the total output load crosses a first threshold 316a, a second segment 324 can end when the total output load crosses a second threshold 316b, etc., each threshold corresponding to the total output load at which the average power of a set of remaining 'n' PSUs would cross below a nominal minimum output load at which the PSUs retain a specified efficiency.

In operation, the system can detect when the total load on the power shelf falls to (or falls below) each successive threshold 316 and, in response, can deactivate one of the PSUs of the power shelf. Deactivating the PSUs of the power shelf results in successive reductions of PSU utilization 312, e.g. from a fully utilized state 318a to a first, partially utilized state 318b in which 'n-1' PSUs are operating, or to a second partially utilized state 318c in which 'n-2' PSUs are operating, and so on. Any suitable number of PSUs can be deactivated, depending on the number of PSUs operating in parallel, such that the average output load 314 remains at or above the minimum output load 320. In the illustrated example, the total load 310 is shown increasing from a third segment 326 to a fourth segment 328 to pass back above the second threshold 316b, at which time the system can reactivate one of the previously deactivated PSUs. Subsequently, the total load 310 increases again from the fourth segment 328 to the fifth segment 330, again above the first threshold 316a, at which time the system can reactivate all of the previously deactivated PSUs. The order in which PSUs are deactivated and reactivated can be predetermined, or can be selected randomly. In some embodiments, the selection of PSUs for deactivation/reactivation is randomized so that, in the context of a large-scale system, the power draw from any particular phase of a multiphase power supply remains balanced with the draw from each other phase. According to some embodiments in multi-phase power supply systems, when multiple PSUs are selected for deactivation (or for reactivation), either simultaneously or sequentially, the system can preferentially select PSUs operating on different phases from each other for deactivation or reactivation. This procedure can reduce the incidence of uneven load distribution across the multiple phases in a multi-phase power system. For example, in a three-phase AC system with A, B, and C phases, a power shelf controller may (randomly) deactivate a PSU receiving power from any one phase (e.g. A phase) in response to a decrease in the output load. When the controller is prompted to deactivate additional PSUs to respond to further decreases in output load, or when the controller simultaneously deactivates multiple PSUs, the controller may select the additional PSU for deactivation from a subset of remaining active PSUs that are running on B phase or C phase, excluding additional active PSUs running on A phase. Similarly, when a power shelf controller is reactivating PSUs, either sequentially or simultaneously, it may selectively activate PSUs that are connected with different phases together or sequentially (e.g. A B or A C but not A A).

Figure 5:
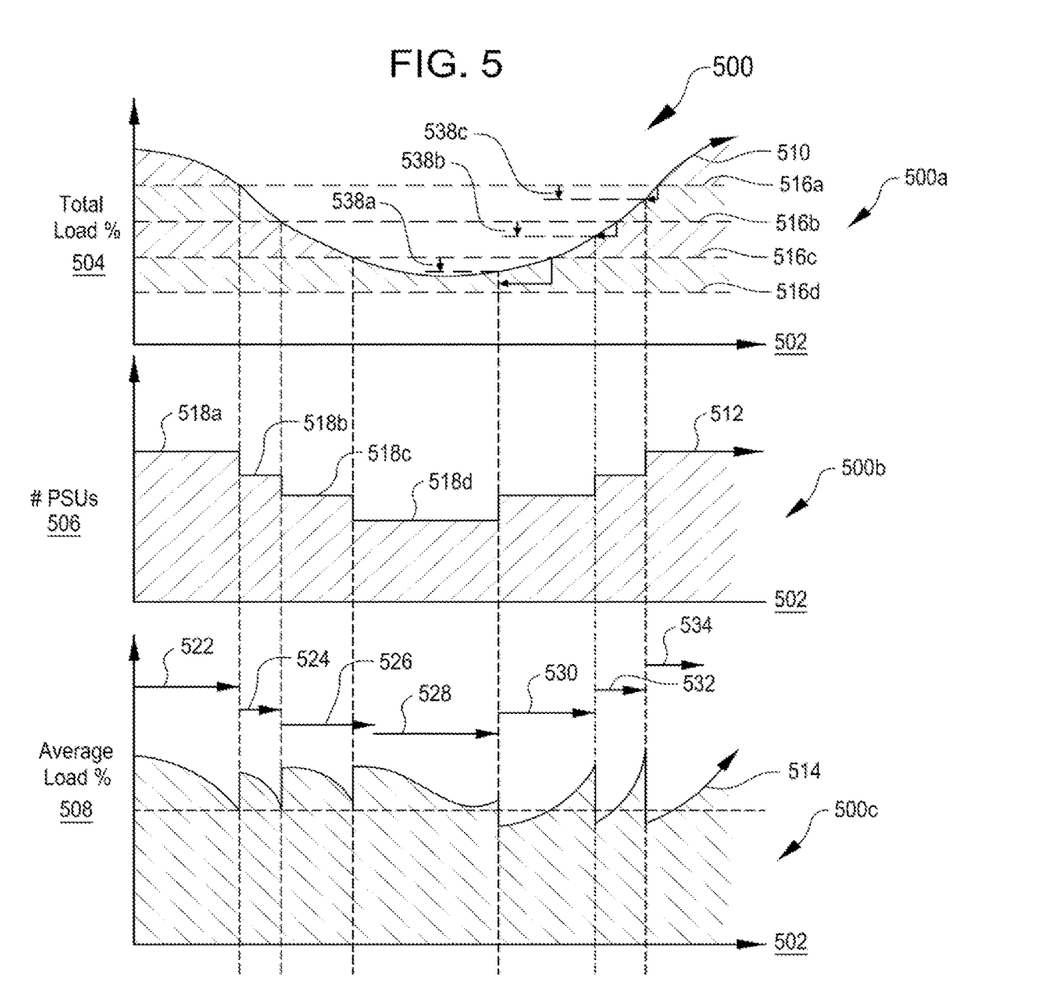
FIG. 5 is a chart illustrating a third example of efficiency optimization via selective power supply utilization that can be employed in the systems of FIGS. 1-2, and according to various embodiments of the present disclosure.
Figure 6:
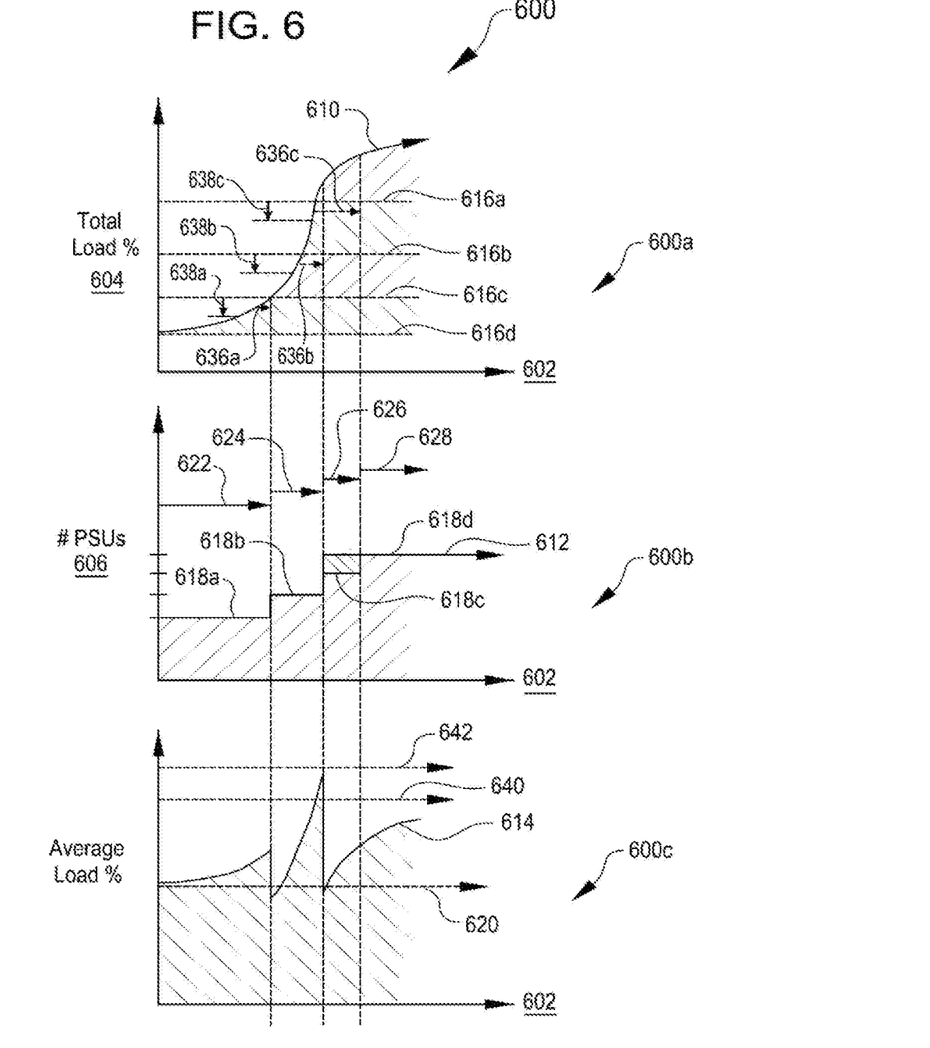
FIG. 6 is a chart illustrating a fourth example of efficiency optimization via selective power supply utilization that can be employed in the systems of FIGS. 1-2, and according to various embodiments of the present disclosure.

The simplified processes illustrated in FIG. 3 may be modified to account for the randomness and granularity inherent in real output loads, and to prevent overly rapid switching of PSUs. For example, FIG. 4 illustrates a similar process utilizing hysteresis to prevent overcorrection, FIG. 5 illustrates a similar process utilizing intermediate thresholding, and FIG. 6 illustrates a similar process using both hysteresis, thresholding, and a process for switching multiple PSUs in response to the same change in output load.

Figure 4:
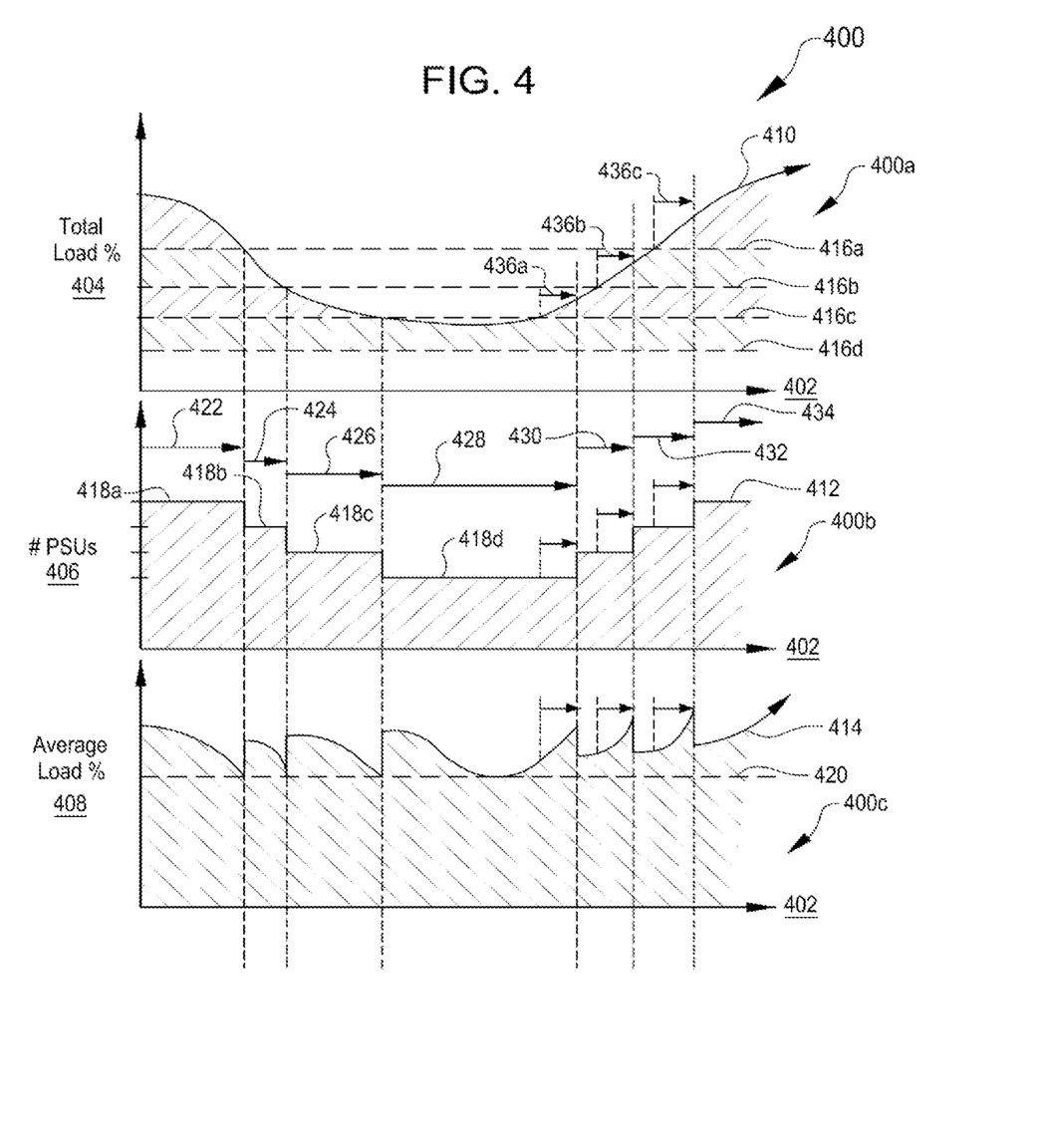
FIG. 4 is a chart illustrating a second example of efficiency optimization via selective power supply utilization that can be employed in the systems of FIGS. 1-2, and according to various embodiments of the present disclosure.

FIG. 4 is a collection of charts 400 illustrating a second example of PSU management in accordance with the systems of FIGS. 1 and 2, and in accordance with various embodiments of the present disclosure. Specifically, FIG. 4 illustrates a simplified example of active PSU management similar to that described with reference to FIG. 3, with the addition of a correction delay between PSU activation or deactivation steps. A total load chart 400a illustrates a fluctuating total output load 410 as a percent of total load 404 on a power source (e.g. AC power source 110) by the power shelf 104 with respect to time 402. A PSU management chart 400b illustrates, in discrete steps, a number of PSUs (or PSU utilization) 412 of the collection of PSUs 406 making up a power shelf that are "active" as opposed to temporarily disabled or inactive. Finally, an average load chart 408 illustrates the effect of PSU deactivation and subsequent reactivation on the effective output load seen by each individual active PSU based on the changing total output load 410 and the PSU utilization 412. Charts 400a-c are not shown to scale.

In the total load chart 400a, a total output load 410 crosses multiple thresholds 416a-c (approaching without crossing 416d), before reversing and returning to a high value across seven discrete segments, 422, 424, 426, 428, 430 432, 434. Each segment 422-434 corresponds to a step in the PSU management chart 400b illustrating changes in PSU utilization 412 from a fully utilized state 418a, to three subsequent partially-utilized states 418b,c,d, back to the fully utilized state. In the process, the average output load 414 (as a % average load 408) can be kept above the minimum output load 420 for each PSU in the collection of PSUs.

Correction delays 436a,b,c are shown in a return portion of the total output load curve 410, by which the system detects when each threshold 416 has been passed, and briefly delays activating the selected PSU. Each respective correction delay 436a,b,c ensures that the correction is sufficiently spaced in time from a preceding change in the direction (i.e., increase or decrease) of the total output load. Similar correction delays can be applied when the total output load is decreasing as well, or can be applied generally when the total output load is either increasing or decreasing. Similarly, correction delays can be used to prevent small, rapid fluctuations from influencing the activation or deactivation of PSUs. For example, the system can monitor the fluctuations in the total output load 410 (or the average load 414) and implement activation or deactivation of PSUs when the total output load 410 both crosses and remains changed with respect to any given threshold 416.

FIG. 5 is a collection of charts 500 illustrating a third example of PSU management in accordance with the systems of FIGS. 1 and 2, and in accordance with various embodiments of the present disclosure. Specifically, FIG. 5 illustrates a simplified example of active PSU management similar to those shown above with reference to FIGS. 3 and 4, with the addition of an intermediate thresholding step. A total load chart 500a illustrates a fluctuating total output load 510 as a percent of total load 504 on a power source (e.g. AC power source 110) by the power shelf 104, with respect to time 502. A PSU management chart 500b illustrates, in discrete steps, a number of PSUs (or PSU utilization) 512 of the collection of PSUs 506 making up a power shelf that are "active" as opposed to temporarily disabled or inactive. Finally, an average load chart 508 illustrates the effect of PSU deactivation and subsequent reactivation on the effective output load seen by each individual active PSU based on the changing total output load 510 and the PSU utilization 512. Charts 500a-c are not shown to scale.

In the total load chart 500a, a total output load 510 crosses multiple thresholds 516a-c (approaching without crossing 516d), before reversing and returning to a high value across seven discrete segments, 522, 524, 526, 528, 530 532, 534. Each segment 522-434 corresponds to a step in the PSU management chart 500b illustrating changes in PSU utilization 512 from a fully utilized state 518a, to three subsequent partially-utilized states 518b,c,d, back to the fully utilized state. In the process, the average output load 514 (as a % average load 508) can be kept above the minimum output load 520 for each PSU in the collection of PSUs.

Intermediate thresholds 538a,b,c are shown in a return portion of the total output load curve 510, by which the system sets a different threshold when the total output load 510 is increasing than when the total output load is decreasing. For example, the system can selectively deactivate an additional active PSU when the output load 510 decreases through each successive threshold 516, and then subsequently reactivate an additional inactive PSU when the output load 510 increases through each successive intermediate threshold 538. The intermediate thresholds 538 may be set above, or may be set below, corresponding thresholds 516. Note that the example of FIG. 5 shows intermediate thresholds having less than (i.e., preceding) the nominal output load of each corresponding threshold 516. In some embodiments, intermediate thresholds can be set having more than (i.e., following) the nominal output loads associated with each corresponding threshold 516, with similar results to utilizing a time-delay as shown in FIG. 4.

The utilization of specific correction methods (e.g., hysteresis, intermediate thresholding) as shown in FIGS. 4 and 5 may at times cause the average output load to dip below the minimum output load that corresponds to high efficiency. A combination of hysteresis and intermediate thresholding may also be used to reduce oversensitivity to noise or randomness in the output load 510.

FIG. 6 is a collection of charts 600 illustrating a fourth example of PSU management in accordance with the systems of FIGS. 1 and 2, and in accordance with various embodiments of the present disclosure. Specifically, FIG. 6 illustrates a simplified example of active PSU management similar to those shown above with reference to FIGS. 3-5, with both hysteresis and intermediate thresholding, and the addition of simultaneous activation/deactivation of PSUs. A total load chart 600a illustrates a fluctuating total output load 610 as a percent of total load 604 on a power source (e.g. AC power source 110) by the power shelf 104, with respect to time 602. A PSU management chart 600b illustrates, in discrete steps, a number of PSUs (or PSU utilization) 612 of the collection of PSUs 606 making up a power shelf that are "active" as opposed to temporarily disabled or inactive. Finally, an average load chart 600c illustrates the effect of PSU deactivation and subsequent reactivation on the effective output load seen by each individual active PSU based on the changing total output load 610 and the PSU utilization 612. Charts 600a-c are not shown to scale.

A PSU management chart 600b illustrates, in discrete steps, a number of PSUs (or PSU utilization) 612 of the collection of PSUs 606 making up a power shelf that are "active" as opposed to temporarily disabled or inactive. Finally, an average load chart 608 illustrates the effect of PSU deactivation and subsequent reactivation on the effective output load seen by each individual active PSU based on the changing total output load 610 and the PSU utilization 612.

In the total load chart 600a, a total output load 610 crosses multiple thresholds 616a-c (approaching from threshold 616d), across four discrete segments, 622, 624, 626, 628. Each segment 622-628 corresponds to a step in the PSU management chart 600b illustrating changes in PSU utilization 612 from a fully utilized state 618a, to three subsequent partially-utilized states 618b,c,d, back to the fully utilized state. In the process, the average output load 614 (as a % average load 608) can be kept above the minimum output load 620 for each PSU in the collection of PSUs.

Intermediate thresholds 638a,b,c are shown in a return portion of the total output load curve 610, by which the system sets a different threshold when the total output load 610 is increasing than when the total output load is decreasing. For example, the system can selectively deactivate an active PSU when the output load 610 decreases through each successive threshold 616, and reactivate an inactive PSU when the output load 610 increases through each successive intermediate threshold 638. The intermediate thresholds 638 may be set above, or may be set below, corresponding thresholds 616. In conjunction, correction delays 636a,b,c can be implemented when the system detects when each intermediate threshold 636 has been passed. Each respective correction delay 636a,b,c ensures that the correction is sufficiently spaced in time from a preceding change in the direction (i.e., increase or decrease) of the total output load. Similar correction delays can be applied when the total output load is decreasing as well, or can be applied generally when the total output load is either increasing or decreasing. The combination of hysteresis and intermediate thresholding can be used to smooth the system response to changes in output load.

The system may also, in addition to either of the above techniques or separately, cause the simultaneous activation or deactivation of any suitable number of PSUs in order to compensate for rapid fluctuations in total output load. For example, the system may monitor a rate of change of the total output load 610 (or average output load 614) and, in response to detecting a rate of change beyond a predefined value, step the number of active PSUs by activating or deactivating two or more PSUs. Alternatively, the system may set additional thresholds (e.g., additional thresholds 640, 642) that, when crossed, set a condition for activating multiple PSUs simultaneously. Thresholding for the deactivating of multiple PSUs may also occur when the system detects rapid decrease in the total output load, using additional thresholds set below the minimum output load 620.

FIGS. 7-10 illustrate various examples of processes for improving overall efficiency of the power systems by managing the use of PSUs based on output load. Some or all of the processes 700, 800, 900, 1000 (or any other processes described herein, or variations, and/or combinations thereof) may be performed under the control of one or more computer systems configured with executable instructions and may be implemented as code (e.g., executable instructions, one or more computer programs, or one or more applications) executing collectively on one or more processors, by hardware or combinations thereof. The code may be stored on a computer-readable storage medium, for example, in the form of a computer program comprising a plurality of instructions executable by one or more processors. The computer-readable storage medium may be non-transitory. In addition, aspects of processes 700, 800, 900, and 1000 may be used in conjunction with each other, except where clearly contraindicated.

Figure 7:
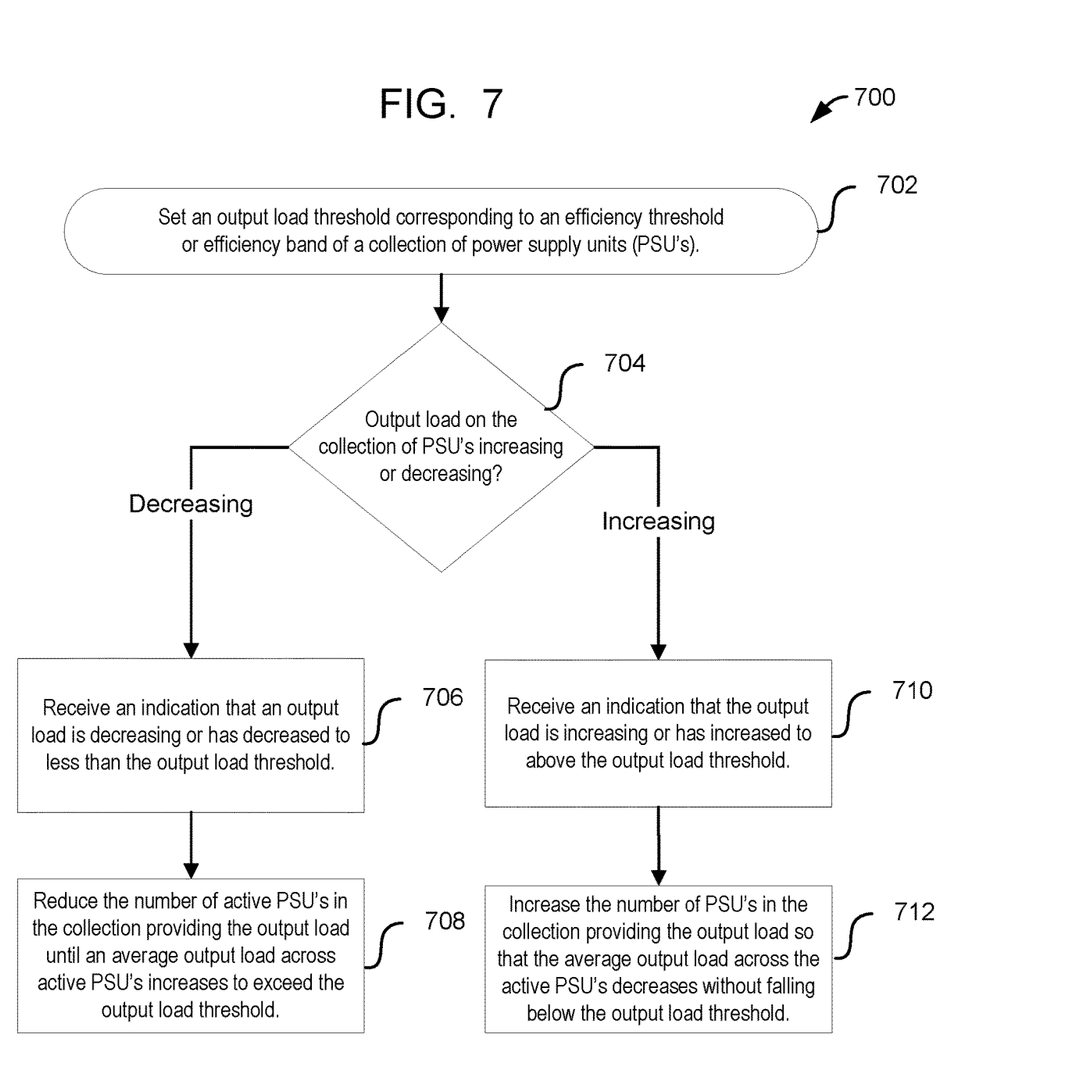
FIG. 7 illustrates a process of selective power supply utilization for improving power supply efficiency, in accordance with various embodiments.

FIG. 7 illustrates a first process 700 for managing PSU utilization in a power system for improving power supply efficiency, in accordance with various embodiments, with particular attention to the approach illustrated in FIG. 3. In accordance with various embodiments, the system can set an output load threshold corresponding to an efficiency threshold or efficiency band of a collection of power supply units (PSU's) (Act 702). The system can then determine whether the output load on the collection of PSU's increasing or decreasing (Act 704), and in response, determine whether to activate (increasing) or deactivate (decreasing) select PSUs. For example, when the system detects that the output load is decreasing or has decreased to less than the output load threshold, (Act 706) the system can respond by reducing the number of active PSU's in the collection providing the output load until an average output load across the remaining active PSU's exceeds the output load threshold (Act 708). Alternatively, when the system detects that the output load is increasing or has increased to above the output load threshold, (Act 710) the system can increase the number of PSU's in the collection providing the output load so that the average output load across the active PSU's decreases. When timed accurately, the average output load increases prior to falling below the output load threshold (Act 712).

Figure 8:
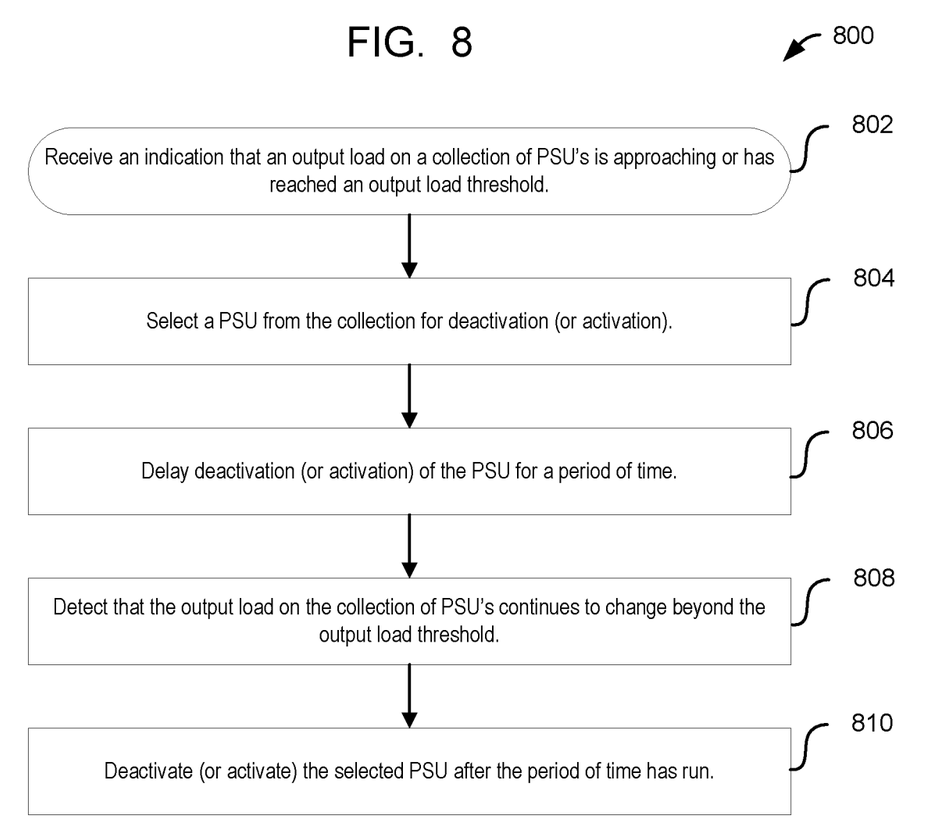
FIG. 8 illustrates a second process of selective power supply utilization for improving power supply efficiency, in accordance with various embodiments.

FIG. 8 illustrates a second process 800 for managing PSU utilization in a power system for improving power supply efficiency, in accordance with various embodiments, with particular attention to the approach illustrated in FIG. 4. In accordance with various embodiments, the system can receive an indication that an output load on a collection of PSU's is approaching or has reached an output load threshold (Act 802). In response, the system can select a PSU from the collection of PSUs (e.g., the power shelf) for deactivation (or activation, or reactivation) (Act 804). The system can delay the deactivation (or activation, or reactivation) of the PSU for a period of time, generally on the order of seconds, milliseconds, or less, to prevent rapid fluctuation in response to granularity or noise in the detected output load (Act 806). The system can then detect that the output load on the collection of PSU's continues to change beyond the output load threshold (Act 808), and respond by completing the deactivation (or activation, or reactivation) of the selected PSU after the period of time has run (Act 810).

Figure 9:
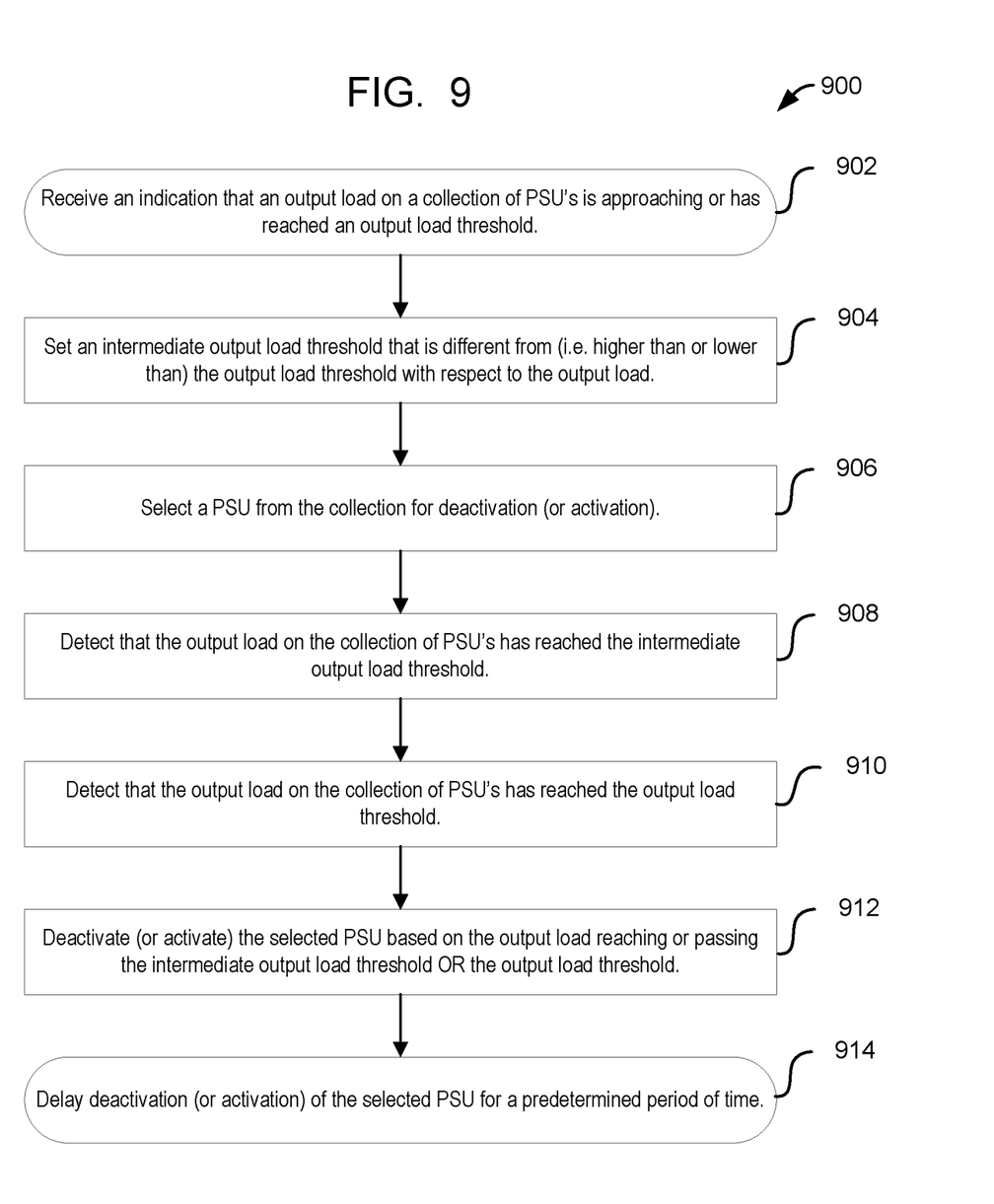
FIG. 9 illustrates a third process of selective power supply utilization for improving power supply efficiency, in accordance with various embodiments.

FIG. 9 illustrates a third process 900 for managing PSU utilization in a power system for improving power supply efficiency, in accordance with various embodiments, with particular attention to the approach illustrated in FIG. 5. In accordance with various embodiments, the system can receive an indication that an output load on a collection of PSU's is approaching or has reached an output load threshold (Act 902). The system can then set an intermediate output load threshold that is different from the output load threshold with respect to the output load (Act 904). Note that each intermediate output load threshold can be either higher or lower than the nominal output load threshold to which it corresponds. For example, in the case of increasing output loads, the intermediate output load threshold may either precede (being lower than) or antecede (being higher than) the nominal output load threshold. The differences between intermediate output load thresholds and their associated output load thresholds may be small, e.g. on the order of about 1-5%, preferably about 1-2%. In the case of decreasing output loads, the intermediate output load may likewise either antecede or precede the nominal output load threshold. The system can select a PSU from the collection for deactivation (or reactivation) (Act 906), and upon detecting that the output load on the collection of PSU's has reached the intermediate output load threshold (Act 908) can deactivate (or activate) the selected PSU based on the output load reaching or passing the intermediate output load threshold (Act 912). In some embodiments, the system may take an intermediate step of confirming that the output load on the collection of PSU's has reached the nominal output load threshold (Act 910). The system may also, optionally, delay deactivation (or activation) of the selected PSU for a predetermined period of time (Act 914).

Figure 10:
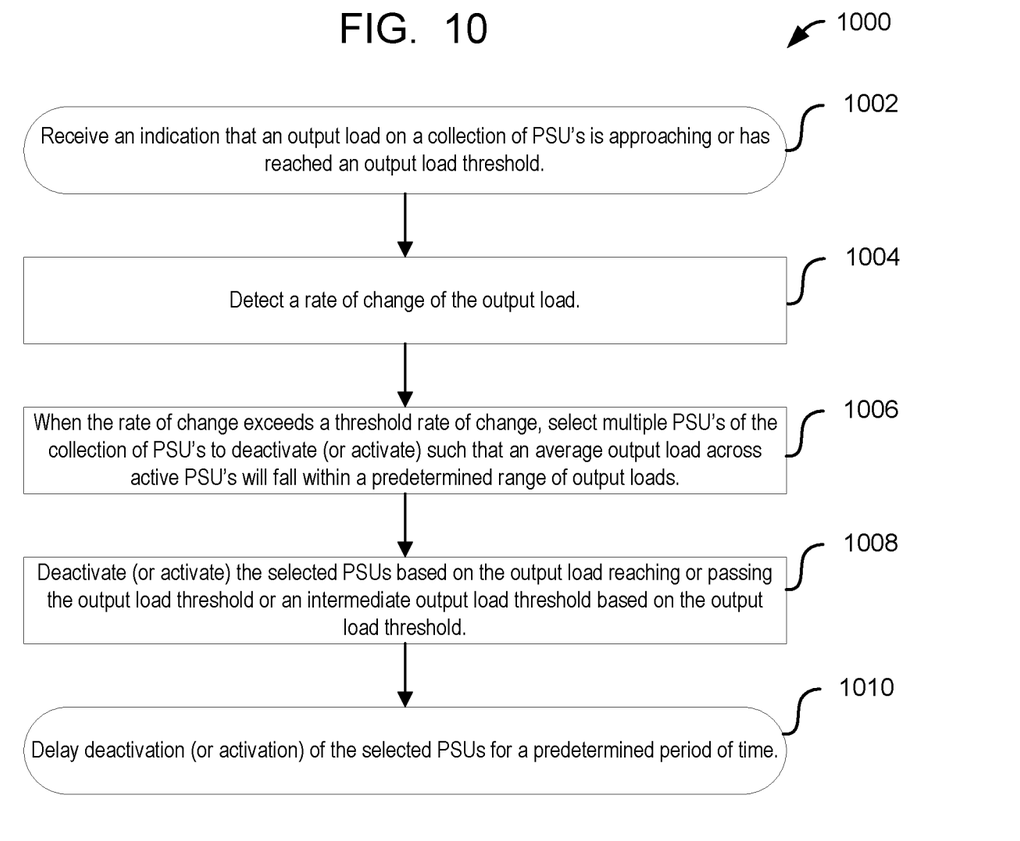
FIG. 10 illustrates a fourth process of selective power supply utilization for improving power supply efficiency, in accordance with various embodiments.

FIG. 10 illustrates a fourth process 1000 for managing PSU utilization in a power system for improving power supply efficiency, in accordance with various embodiments, with particular attention to the approach illustrated in FIG. 6. In accordance with various embodiments, the system can receive an indication that an output load on a collection of PSU's is approaching or has reached an output load threshold (Act 1002). The system can then detect a rate of change of the output load (Act 1004) and, when the rate of change exceeds a threshold rate of change, select multiple PSU's of the collection of PSU's to deactivate (or activate). The selection of PSUs (e.g. the number of PSUs to activate or deactivate) can be made such that an average output load across active PSU's will fall within a predetermined range of output loads following completion of the activation or deactivation (Act 1006). The system can then deactivate (or activate) the selected PSUs based on the output load reaching or passing the output load threshold or a corresponding intermediate output load threshold (Act 1008). As described above, the system can optionally delay deactivation (or activation) of the selected PSUs for a predetermined period of time (Act 1010).

Various computing environments may be used, as appropriate, to implement various embodiments as described herein including web- or cloud-based computing environments, computing environments based on local controllers, or combinations of the above. User or client devices can include any of a number of general purpose personal computers, such as desktop or laptop computers running a standard operating system, as well as cellular, wireless and handheld devices running mobile software and capable of supporting a number of networking and messaging protocols. Such an environment also can include a number of workstations running any of a variety of commercially-available operating systems and other known applications for purposes such as development and database management. These workstations also can include other electronic devices, such as dummy terminals, thin-clients, gaming systems and other devices capable of communicating via a network and used for communicating with sensors, displays, actuators, and user interfaces, among other devices.

For example, user interfaces (such as user I/O module 112, FIG. 1) can include any appropriate device operable to send and receive requests, messages, or information over an appropriate network and convey information back to a user of the device. Examples of such devices include portable displays, personal computers, cell phones, handheld messaging devices, laptop computers, set-top boxes, personal data assistants, electronic book readers, and the like. The network can include any appropriate network, including an intranet, the Internet, a cellular network, a local area network, or any other such network or combination thereof. Components used in conjunction with such a network can depend at least in part upon the type of network and/or environment selected. Protocols and components for communicating via such a network are well known and will not be discussed herein in detail. Communication over the network can be enabled by wired or wireless connections and combinations thereof.

Suitable computing environments can include, in various embodiments, a server and data store. It should be understood that there can be several servers, layers, or other elements, processes, or components, which may be chained or otherwise configured, which can interact to perform tasks such as obtaining data, processing said data, and communicating data or with users. For example, according to various embodiments, a controller such as power management controller 110 (FIG. 1) can include a server and/or a virtual machine emulated by a server. As used herein the term "data store" refers to any device or combination of devices capable of storing, accessing, and retrieving data, which may include any combination and number of data servers, databases, data storage devices, and data storage media, in any standard, distributed, or clustered environment. The server can include any appropriate hardware and software for integrating with the data store as needed to execute aspects of one or more applications for the client device, handling a majority of the data access and logic for an application. It should be understood that servers are not required and are merely example components, as structured code discussed herein can be executed on any appropriate device or host machine as discussed elsewhere herein.

The data store can include several separate data tables, databases or other data storage mechanisms and media for storing data relating to a particular aspect. For example, the data store can include a mechanism for storing data for reporting, analysis, or other such purposes. The data store is operable, through logic associated therewith, to receive instructions and obtain, update or otherwise process data in response thereto.

Each server can include an operating system that provides executable program instructions for the general administration and operation of that server in conjunction with a computer-readable storage medium (e.g., a hard disk, random access memory, read only memory, etc.) storing instructions that, when executed by a processor of the server, allow the server to perform its intended functions. Suitable implementations for the operating system and general functionality of the servers are known or commercially available and are readily implemented by persons having ordinary skill in the art, particularly in light of the disclosure herein.

A computing environment according to various embodiments can be a distributed computing environment utilizing several computer systems and components that are interconnected via communication links, using one or more computer networks or direct connections. However, it will be appreciated by those of ordinary skill in the art that the embodiments discussed above could operate equally well in a computing environment having fewer or a greater number of components, including systems operated under the control of a single computing device in communication with any suitable combination of the various sensors, input/output devices and/or actuators discussed herein.

Computing environments as discussed herein can include a variety of data stores and other memory and storage media as discussed above. Where a system includes computerized devices, each such device can include hardware elements that may be electrically coupled via a bus, the elements including, for example, at least one central processing unit ("CPU"), at least one input device (e.g., a mouse, keyboard, controller, touch screen, or keypad), and at least one output device (e.g., a display device, printer, or speaker). Such a system may also include one or more storage devices, such as disk drives, optical storage devices, and solid-state storage devices such as random access memory ("RAM") or read-only memory ("ROM"), as well as removable media devices, memory cards, flash cards, etc.

Suitable media can also include a computer-readable storage media reader, a communications device (e.g., a modem, a network card (wireless or wired)), an infrared communication device, etc.), and working memory as described above. The computer-readable storage media reader can be connected with, or configured to receive, a computer-readable storage medium, representing remote, local, fixed, and/or removable storage devices as well as storage media for temporarily and/or more permanently containing, storing, transmitting, and retrieving computer-readable information. The system and various devices can also include a number of software applications, modules, services, or other elements located within at least one working memory device, including an operating system and application programs, such as a client application or Web browser. It should be appreciated that alternate embodiments may have numerous variations from that described above. For example, customized hardware might also be used and/or particular elements might be implemented in hardware, software (including portable software, such as applets), or both. Further, connection to other computing devices such as network input/output devices may be employed.

Storage media computer readable media for containing code, or portions of code, can include any appropriate media known or used in the art, including storage media and communication media, such as but not limited to volatile and non-volatile, removable and non-removable media implemented in any method or technology for storage and/or transmission of information such as computer readable instructions, data structures, program modules, or other data, including RAM, ROM, Electrically Erasable Programmable Read-Only Memory ("EEPROM"), flash memory or other memory technology, Compact Disc Read-Only Memory ("CD-ROM"), digital versatile disk (DVD), or other optical storage, magnetic cassettes, magnetic tape, magnetic disk storage, or other magnetic storage devices, or any other medium which can be used to store the desired information and which can be accessed by a system device. Based on the disclosure and teachings provided herein, a person of ordinary skill in the art will appreciate other ways and/or methods to implement the various embodiments.

The specification and drawings are, accordingly, to be regarded in an illustrative rather than a restrictive sense. It will, however, be evident that various modifications and changes may be made thereunto without departing from the broader spirit and scope of the disclosure as set forth in the claims.

Other variations are within the spirit of the present disclosure. Thus, while the disclosed techniques are susceptible to various modifications and alternative constructions, certain illustrated embodiments thereof are shown in the drawings and have been described above in detail. It should be understood, however, that there is no intention to limit the disclosure to the specific form or forms disclosed, but on the contrary, the intention is to cover all modifications, alternative constructions, and equivalents falling within the spirit and scope of the disclosure, as defined in the appended claims.

The use of the terms "a" and "an" and "the" and similar referents in the context of describing the disclosed embodiments (especially in the context of the following claims) are to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. The term "connected" is to be construed as partly or wholly contained within, attached to, or joined together, even if there is something intervening. Recitation of ranges of values herein are merely intended to serve as a shorthand method of referring individually to each separate value falling within the range, unless otherwise indicated herein and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate embodiments of the disclosure and does not pose a limitation on the scope of the disclosure unless otherwise claimed. No language in the specification should be construed as indicating any non-claimed element as essential to the practice of the disclosure.

Disjunctive language such as the phrase "at least one of X, Y, or Z," unless specifically stated otherwise, is intended to be understood within the context as used in general to present that an item, term, etc., may be either X, Y, or Z, or any combination thereof (e.g., X, Y, and/or Z). Thus, such disjunctive language is not generally intended to, and should not, imply that certain embodiments require at least one of X, at least one of Y, or at least one of Z to each be present.

Various embodiments of this disclosure are described herein, including the best mode known to the inventors for carrying out the disclosure. Variations of those embodiments may become apparent to those of ordinary skill in the art upon reading the foregoing description. The inventors expect skilled artisans to employ such variations as appropriate and the inventors intend for the disclosure to be practiced otherwise than as specifically described herein. Accordingly, this disclosure includes all modifications and equivalents of the subject matter recited in the claims appended hereto as permitted by applicable law. Moreover, any combination of the above-described elements in all possible variations thereof is encompassed by the disclosure unless otherwise indicated herein or otherwise clearly contradicted by context.

What is claimed is:

1. A system for supplying electrical power to components in a datacenter, the system comprising:
   a plurality of direct current (DC) powered components;
   a power source;
   power supply units (PSUs) that receive electrical power from the power source and output DC electrical power to the DC powered components, the PSUs being connected in parallel between the power source and the DC powered components; and
   a controller comprising a processing unit and a memory device storing instructions executable by the processing unit to cause the processing unit to:
      monitor a current combined power output load of the PSUs;
      determine an optimum number of the PSUs to operate to supply the current combined power output load of the PSUs to optimize power generation efficiency of the PSUs;
      compare a current number of the PSUs being operated with the optimum number of the PSUs to operate; and
      change the current number of the PSUs being operated, such that the current number of PSUs being operated is equal to the optimum number of PSUs to operate.

2. The system of claim 1, wherein the controller is further configured with executable instructions to:
   detect whether the current combined power output load is increasing or decreasing; and
   in response to the current combined power output load decreasing, determine that the current number of PSUs being operated is greater than the optimum number of PSUs to operate by detecting that the current combined power output load is decreasing from more than an output load threshold to less than the output load threshold.

3. The system of claim 2, wherein the controller is further configured with executable instructions to:
   in response to the current combined power output load increasing, determine that the current number of PSUs being operated is less than the optimum number of PSUs to operate by detecting that the current combined power output load is increasing from below the output load threshold to above the output load threshold.

4. The system of claim 2, wherein the controller is further configured with executable instructions to:
   in response to the current combined power output load increasing, determine that the current number of PSUs being operated is less than the optimum number of PSUs to operate by detecting that the current combined power output load is increasing from below an intermediate output load threshold to above the intermediate output load threshold, the intermediate output load threshold being different than the output load threshold.

5. The system of claim 2, wherein the controller is further configured with executable instructions to:
   prior to changing the number of PSUs being operated, maintaining the current number of the PSUs being operated for a period of time.

6. The system of claim 1, wherein the controller is further configured with executable instructions to:
   determine a rate of change of the current combined power output load of the PSUs; and in response to detecting that the rate of change exceeds a predetermined rate of change, deactivate or activate a plurality of the PSUs, wherein a number of the plurality of the PSUs is selected based on the rate of change.

7. A computer-implemented method, comprising:
monitoring, by a controller, a current combined power output load of a collection of power supply units (PSUs);
comparing, by the controller, the current combined power output load of the PSUs being operated with a first power output load threshold; and
in response to the current combined power output load falling below the first power output load threshold, deactivating, by the controller, one of the PSUs to reduce a number of the PSUs being operated.

8. The computer-implemented method of claim 7, wherein the deactivating, by the controller, the one of the PSUs causes an average power output load of the PSUs being operated to be higher than an average power output load threshold.

9. The computer-implemented method of claim 7, further comprising:
in response to the current combined power output load rising above a second power output load threshold, activating, by the controller, one of the PSUs to increase the number of PSUs being operated.

10. The computer-implemented method of claim 9, wherein the second power output load threshold is above the first power output load threshold.

11. The computer-implemented method of claim 9, wherein the second power output load threshold is below the first power output load threshold.

12. The computer-implemented method of claim 9, further comprising:
prior to deactivating or activating the one of the PSUs, delaying deactivation or activation by a predetermined delay based on a preceding deactivation or activation of another one of the PSUs of the collection of PSUs.

13. The computer-implemented method of claim 7, wherein the PSUs are connected with distinct phases of a multi-phase AC power source, the method further comprising:
randomly selecting the one of the PSUs from the collection of PSUs for deactivation.

14. The computer-implemented method of claim 7, further comprising:
determining a desired number of the PSUs to operate to supply the current combined power output load; and
selectively deactivating one or more of the PSUs to decrease the number of the PSUs being operated to match the desired number of the PSUs.

15. The computer-implemented method of claim 7, wherein the first power output load threshold corresponds to a low value of the current combined power output load, whereby an efficiency of the collection of PSUs decreases at output loads less than the first power output load threshold.

16. The computer-implemented method of claim 7, further comprising:
detecting a rate of change of the current combined power output load; and
in response to detecting that the rate of change of the current combined power output load exceeds a predetermined rate of change, deactivating two or more PSUs of the collection of PSUs.

17. A system, comprising:
a controller configured with executable instructions to operate a collection of power supply units (PSUs) to:
receive an indication that a current combined output load, by an electronic component on a collection of PSUs configured in parallel to supply power to the electronic component from a power supply, is decreasing from more than an output load threshold to less than the output load threshold, the output load threshold based on a target efficiency of the collection of PSUs; and
in response to the indication that the current combined output load is decreasing, selectively deactivating an active PSU of the collection of PSUs such that an average output load of active PSU's of the collection of PSU's is above a target average output load corresponding to the target efficiency of the collection of PSUs.

18. The system of claim 17, wherein the output load threshold corresponds to a reduced efficiency of the collection of PSUs, whereby the collection of PSUs decreases in efficiency when the current combined output load decreases to less than the output load threshold.

19. The system of claim 17, wherein the controller is further configured with executable instructions to:
receive an indication that the current combined output load is increasing from less than the output load threshold to more than the output load threshold; and
in response to the indication that the current combined output load is increasing, selectively activate an inactive PSU of the collection of PSUs.

20. The system of claim 19, wherein the controller is further configured with executable instructions to:
delay the selective deactivation or activation of the active PSU or the inactive PSU by a predetermined period of time after a preceding activation or deactivation of the active PSU or the inactive PSU.

* * * * *